United States Patent
Anazawa et al.

[19]

[11] Patent Number: 6,094,927
[45] Date of Patent: Aug. 1, 2000

[54] COOLING STRUCTURE AN ELECTRIC VEHICLE

[75] Inventors: Makoto Anazawa; Kazuhiko Aitaka; Kazunori Watanabe, all of Wako, Japan

[73] Assignee: Honda Giken Kogyo Kabushiki Kaisha, Tokyo, Japan

[21] Appl. No.: 09/216,027

[22] Filed: Dec. 18, 1998

[30] Foreign Application Priority Data

Dec. 18, 1997 [JP] Japan ................................ 9-348796

[51] Int. Cl.⁷ ........................................................ B60H 1/32
[52] U.S. Cl. ............................... 62/239; 62/244; 62/259.2
[58] Field of Search ..................... 62/244, 259.2, 62/239

[56] References Cited

U.S. PATENT DOCUMENTS

| | | | |
|---|---|---|---|
| 5,284,025 | 2/1994 | Kajitani et al. | 62/160 |
| 5,345,777 | 9/1994 | Sekino et al. | 62/244 |
| 5,488,837 | 2/1996 | Sekino et al. | 62/244 |
| 5,572,881 | 11/1996 | Hotta et al. | 62/278 |
| 5,582,234 | 12/1996 | Samukawa et al. | 165/204 |
| 5,878,589 | 3/1999 | Tanaka et al. | 62/199 |
| 5,937,664 | 8/1999 | Matsuno et al. | 62/259 |
| 5,964,279 | 10/1999 | Mochizuki et al. | 165/104.33 |

*Primary Examiner*—Henry Bennett
*Assistant Examiner*—Mark Shulman
*Attorney, Agent, or Firm*—Carrier, Blackman & Associates, P.C.; Joseph P. Carrier; William D. Blackman

[57] ABSTRACT

An electric vehicle includes plurality of batteries accommodated in a rear portion of a battery box, and an electric part is accommodated in an electric part accommodating chamber provided in a front portion of the battery box. Cooling air supplied from a cooling fan to the rear portion of the battery box cools the batteries having a large thermal resistance, while being passed through a first cooling air passage around outer peripheries of the batteries at a low flow rate. A second cooling air passage having a smaller sectional area than that of the first cooling air passage is provided below the electric part accommodating chamber, and cooling fins protruding downwards from the electric part are exposed within the second cooling air passage. The second cooling air passage extends continuously the first cooling air passage in a downstream direction of airflow, so that cooling air which has first cooled the batteries then cools the electric part having a smaller thermal resistance, while being passed through the second cooling air passage at a higher flow rate than that in the first cooling air passage.

18 Claims, 9 Drawing Sheets

COOLING STRUCTURE AN ELECTRIC VEHICLE

BACKGROUND OF THE INVENTION

1. Field of the Invention

The present invention relates to a cooling structure in an electric vehicle for cooling batteries and/or an electric part cooling air from a cooling fan.

2. Description of the Related Art

In a conventional electric vehicle including batteries disposed below a floor panel, electric parts such as a motor controller, a PDU and the like are disposed in an engine compartment or other vehicle compartment, and correspondingly a cooling fan for cooling the batteries and a cooling fan for cooling the electric parts are provided separately.

If the batteries and the electric parts are disposed in different places as described above, a plurality of cooling fans are required. Therefore, if the batteries and the electric part were mounted within a battery box and they are cooled collectively by a common cooling fan, the number of cooling fans can be reduced.

In this regard the effect of cooling air on the batteries each having a battery case made of a synthetic resin with a large thermal resistance maybe less enhanced, if the flow speed of the cooling air is high. Instead, it is desirable that the cooling air having a low flow rate be applied uniformly to all the batteries. On the other hand, the electric parts have a casing or cooling fins made of a metal which has a far smaller thermal resistance as compared with the battery cases. For this reason, a smaller flow amount of the cooling air is required, and the cooling effect achieved by cooling air having a high flow rate is appropriate for the electric parts.

If the cooling air obtained utilizing the outside air as it is, is applied directly to a delicate electric part, there is a possibility that an adverse effect may be exerted to the reliability and durability of the electric part due to dusts and water contained-in the cooling air. It can be conceived to filter the outside air to remove the dusts and water. However, to carry out such a treatment requires a special filter, resulting in a problem of cost increase.

SUMMARY OF THE INVENTION

Accordingly, it is a first object of the present invention to ensure that both the batteries and the electric parts accommodated in a battery box of an electric vehicle can be effectively cooled by the cooling air from a common cooling fan.

It is a second object of the present invention to reliably cool the electric parts for the electric vehicle without exerting an adverse effect on the reliability and durability of the electric, parts.

To achieve the above first object, according to a first and feature of the present invention, there is provided a cooling structure in vehicle comprising batteries for supplying electric current to a motor, and an electric part connected to at least one of the motor and the batteries, wherein the batteries and the electric part are accommodated in a battery box and are cooled by supplying cooling air from a cooling fan to cooling air passages defined in the battery box, wherein a sectional area of a second one of the cooling air passages for cooling the electric part is smaller than that of a first one of the cooling air passages for cooling the batteries.

With the above arrangement, on the one hand the cooling air supplied from the cooling fan to the first cooling air passage having the larger sectional area can effectively cool the batteries having a larger thermal resistance, while flowing at a lower flow rate in the first cooling air passage. On the other hand, the cooling air supplied from the cooling fan to the second cooling air passage having a smaller sectional area can effectively cool the electric part having a small thermal resistance, while flowing at a higher flow rate in the second cooling air passage. In this manner, the cooling of both the batteries and the electric part having different thermal resistances can be effectively achieved by use of the common fan.

According to a second aspect and feature of the present invention, in addition to the arrangement of the first feature, the first cooling air passage and the second cooling air passage are disposed at locations upstream and downstream in a direction of flow of the cooling air, respectively.

With the above arrangement, by disposing the batteries having a narrow acceptable range of temperature as compared with the electric part, at the location upstream in the direction of flowing of the cooling air, the batteries can be reliably cooled by the fresh outside air at ambient temperature. The cooling air which has cooled the batteries and thus has a raised temperature is then applied to the electric part, but this provides no hindrance because the electric part has a wide acceptable range of temperature, as compared with the batteries.

To achieve the second object above, according to a third aspect and feature of the present invention, there is provided a cooling structure in an electric vehicle in which an electric part connected to one of a driving motor and batteries for supplying electric current to the motor is cooled by cooling air from a cooling fan. The cooling structure comprises a cooling air passage for flowing of the cooling air from the cooling fan, the cooling air passage being disposed adjacent an electric part accommodating chamber in which the electric part is accommodated, and cooling fins extending from the electric part accommodated in the electric part accommodating chamber being disposed to protrude into the cooling air passage.

With the above arrangement, when the cooling air supplied from the cooling fan flows in cooling air passage, the heat exchange is carried out between the cooling air and the cooling fins protruding into the cooling air passage to cool the electric part. The electric part is accommodated in the electric part accommodating chamber defined adjacent the cooling air passage, so that it does not come into direct contact with the cooling air and hence, there is not a possibility that the reliability and durability of the electric part are reduced due to dusts, water and other foreign matter contained in the cooling air.

The above and other objects, features and advantages of the invention will become apparent from the following description of the presently preferred embodiments taken in conjunction with the accompanying drawings.

BRIEF DESCRIPTION OF THE DRAWINGS

FIGS. 1 to 7 show a first embodiment of the present invention, wherein

FIG. 1 is a side view of the entire electric vehicle battery box and cooling means for an electric vehicle according to a;

FIGS. 8 and 9 show a second embodiment of the present invention, wherein

DETAILED DESCRIPTION OF THE PRESENTLY PREFERRED EMBODIMENTS

A first preferred embodiment of the present invention will now be described with reference to FIGS. 1 to 7.

Figure 1:
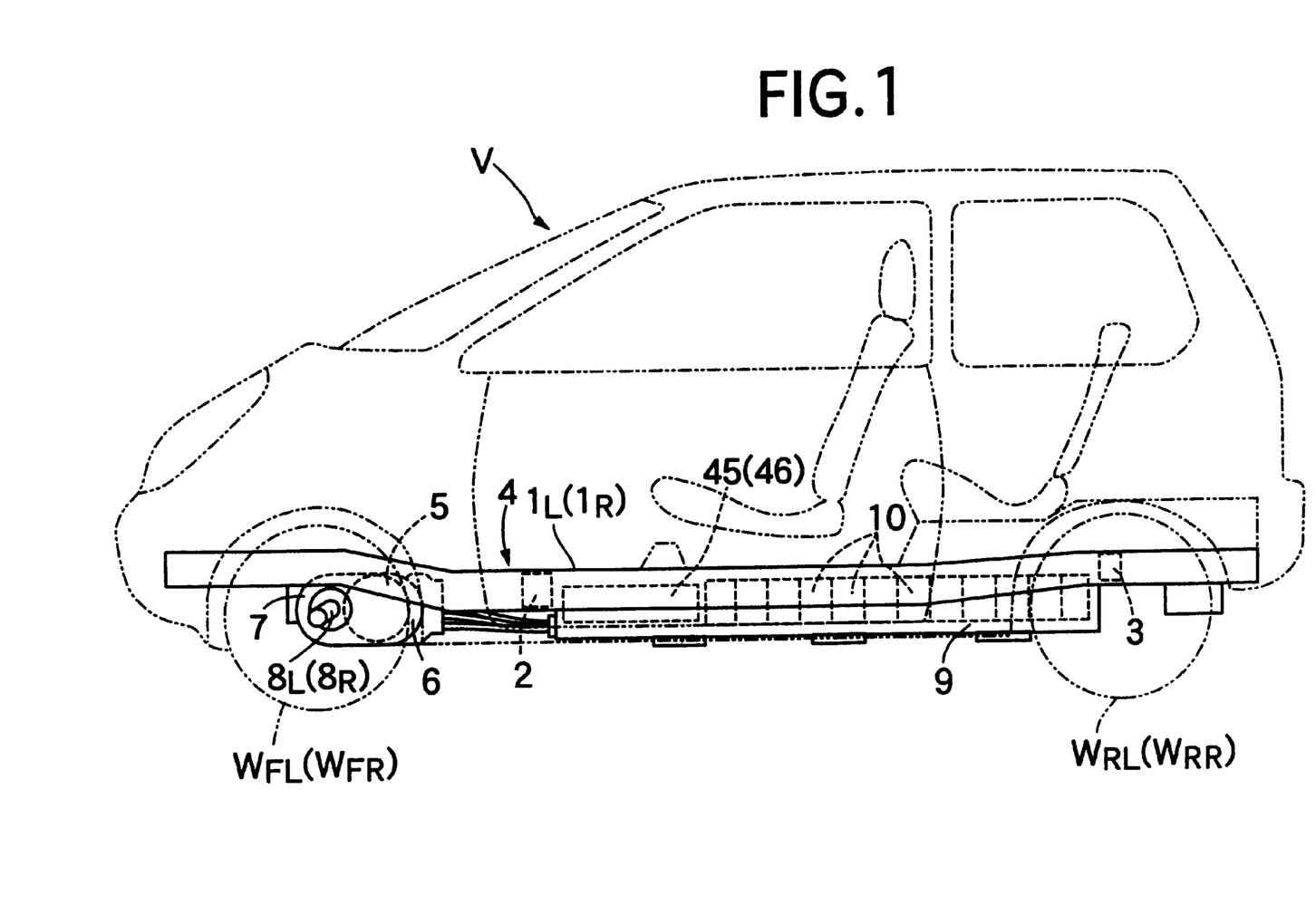
Figure 2:
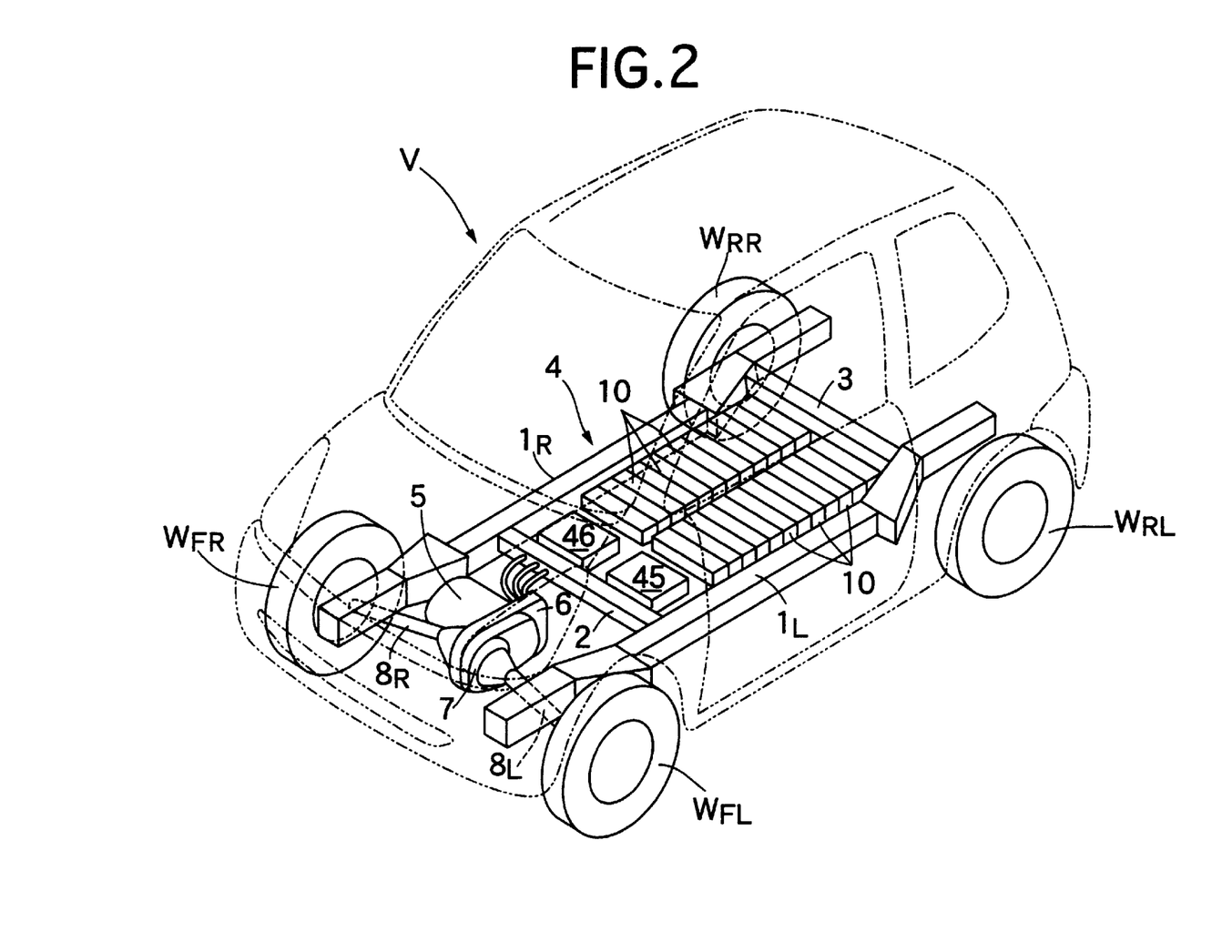
FIG. 2 is a perspective view of the entire electric vehicle.
Figure 3:
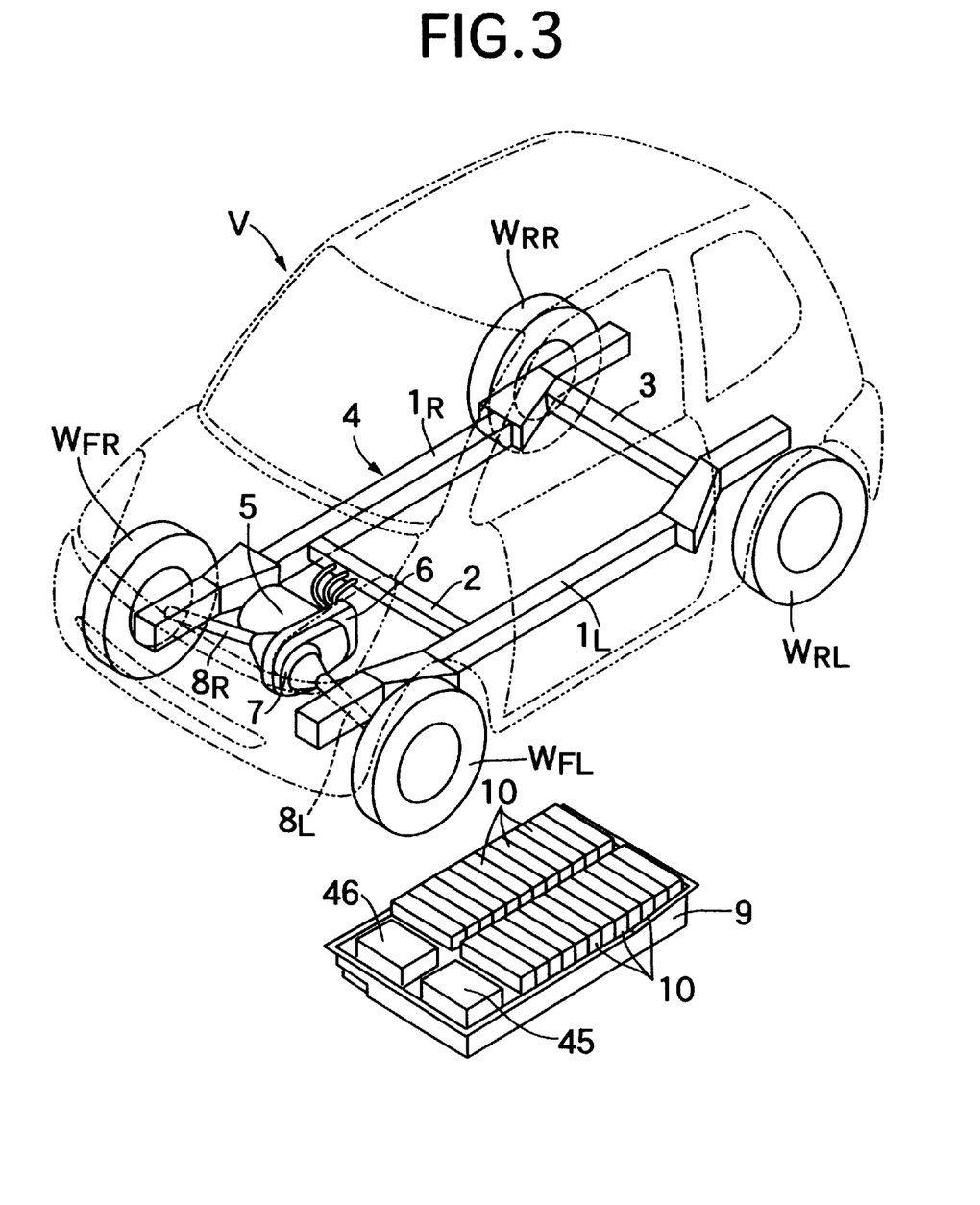
FIG. 3 is a perspective view of the entire electric vehicle with a battery box removed.

As shown in FIGS. 1 to 3, an electric vehicle V provided with left and right front wheels $W_{FL}$ and $W_{FR}$ and left and right rear wheels $W_{RL}$ and $W_{RR}$ includes a vehicle body frame assembly 4 which is comprised of a pair of left and right side frames $1_L$ and $1_R$ extending in a longitudinal direction of a vehicle body, and a front cross member 2 and a rear cross member 3 which extend in a lateral direction of the vehicle body and connect the side frames $1_L$ and $1_R$ to each other. A reducer 6 and a differential 7 are integrally provided on a motor 5 which is a traveling drive source mounted between front ends of the left and right side frames $1_L$ and $1_R$. Drive shafts $8_L$ and $8_R$ extending laterally from the differential 7 are connected to the left and right front wheels $W_{FL}$ and $W_{FR}$, respectively.

A shallow tray-shaped battery box 9 with its upper surface opened is detachably supported on a lower surface of the vehicle body frame assembly 4. Twenty four batteries 10 for supplying electric current to the motor 5 are mounted in two rows in a rear half of the battery box 9, and electric parts including the following components (1) and (2) are mounted in two separated blocks in a front half of the battery box 9: (1) a control unit 11 for controlling the motor 5, the batteries 10, and various auxiliaries, and (2) a PDU (power drive unit) 12 for controlling the driving and regenerative operation of the motor 5 by a command from the control unit.

Figure 4:
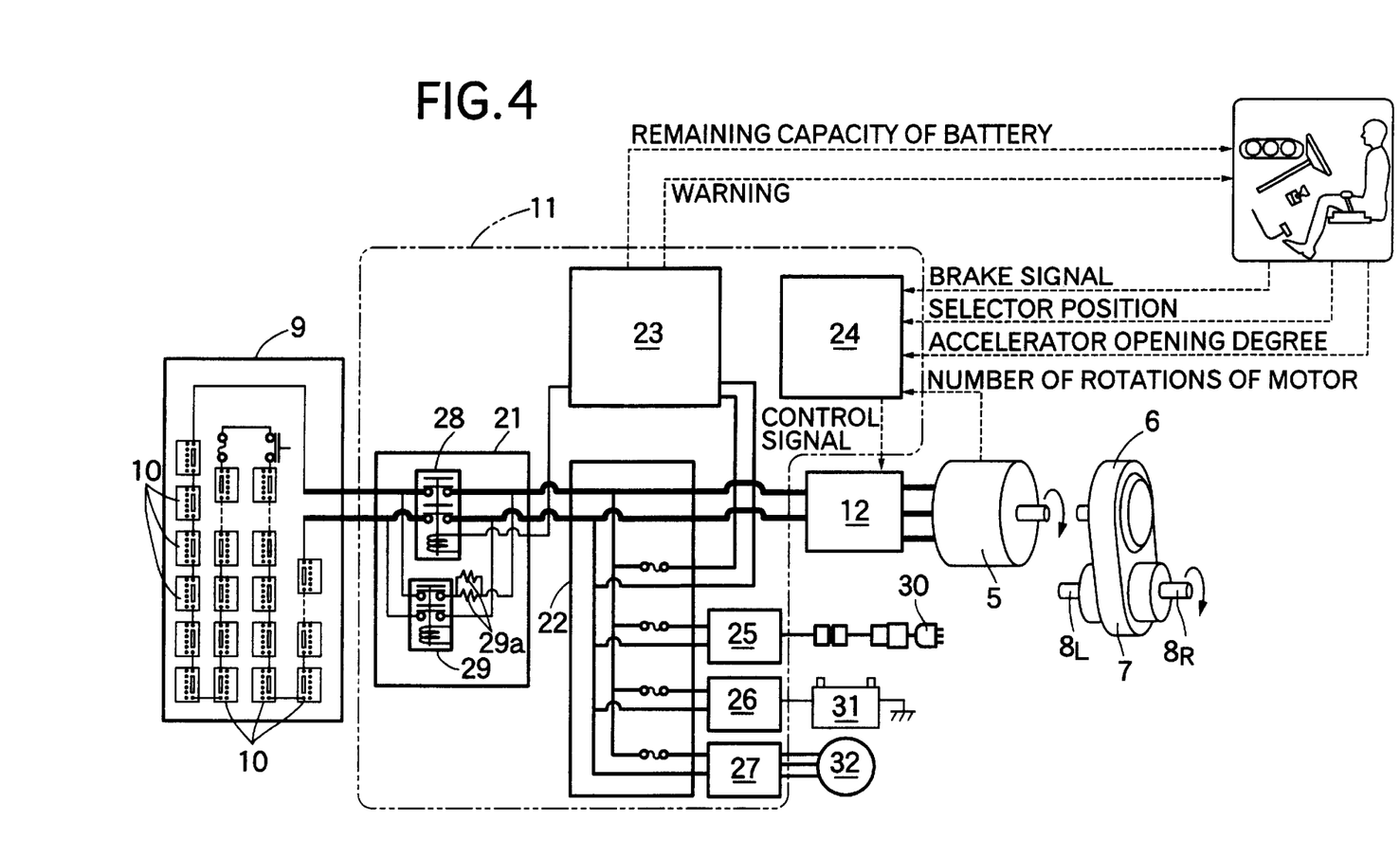
FIG. 4 is a block diagram of a driving system and a control system in the electric vehicle.

The outline of the arrangement of a drive system and a control system for the electric vehicle V will now be described with reference to FIG. 4. In FIG. 4, thick solid lines indicate high-voltage and high-current lines; medium solid lines indicate high-voltage and medium-current lines; thin solid lines indicate low-voltage and low-current lines; and arrowed dashed lines indicate signal lines.

The control unit 11 is comprised of a contact box 21, a junction board 22, a managing ECU 23 (a managing electronic control unit), a motor ECU 24 (a motor electronic control unit), an on-board charger 25, a downverter 26, and an air-conditioning inverter 27.

The batteries 10 are mounted in the battery box 9, each of which is comprised of an Ni-MH battery, and the twenty four batteries 10 are connected in series to provide a total voltage of 288 V. The contact box 21, the junction board 22 and the PDU 12 are connected in series between the battery box 9 and the motor 5 through power lines.

Provided in the contact box 21 connected to the batteries 10 are a main contact 28 which is opened and closed in operative association with an ignition switch, and a pre-charger contact 29 and a pre-charger resistor 29a for preventing the main contact 28 from being damaged due to rush current upon closing of the main contact 28. The junction board 22 has a function to distribute electric current from power lines between the contact box 21 and the PDU 12 to the on-board charger 25, the downverter 26 and the air-conditioning inverter 27. The on-board charger 25 serves to charge the batteries 10, and includes a plug 30 connectable to an external commercial power source. The downverter 26 serves to charge an auxiliary battery 31 of 12 volts for driving the various auxiliaries of the electric vehicle V, and is adapted to drop the voltage of the batteries 10 to 14.5 V to supply it to the auxiliary battery 31. The air-conditioning inverter 27 is adapted to convert the DC current of the batteries 10 into the AC current to drive a compressor 32 of an air conditioner.

The managing ECU 23 governs the control of opening and closing of the main contact 28, the supplying of power to the on-board charger 25, the downverter 26 and the air-conditioning inverter 27, the outputting of a signal indicative of a remaining capacity of the batteries 10, and the outputting of a warning signal. The motor ECU 24 controls the driving force and the regenerative braking force generated by the motor 5 by controlling the PDU 12 based on a brake signal, a selector position, an accelerator opening degree and a number of rotations per minute of the motor.

Figure 6:
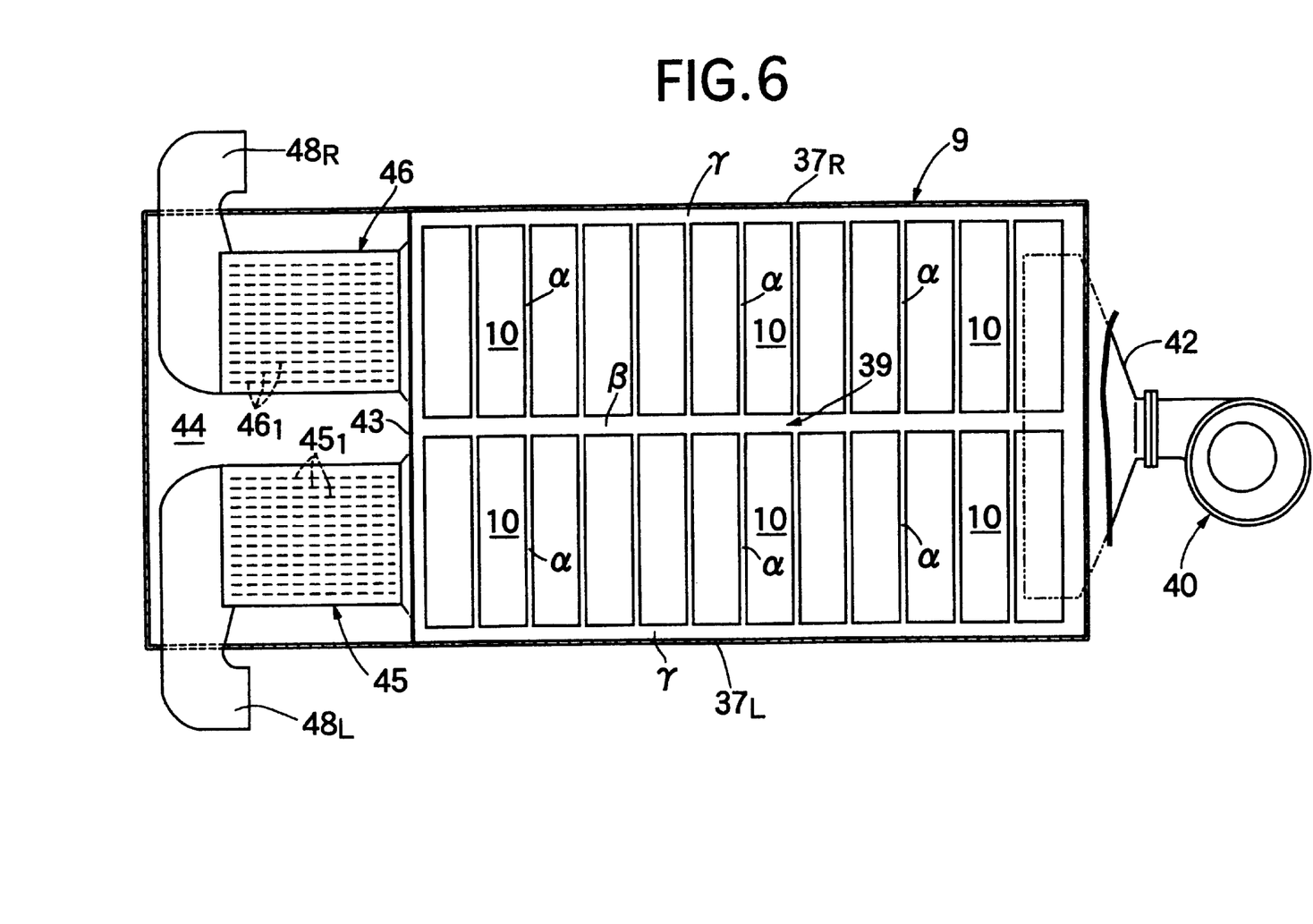
FIG. 6 is a sectional view taken along a line 6—6 in FIG. 5.
Figure 7:
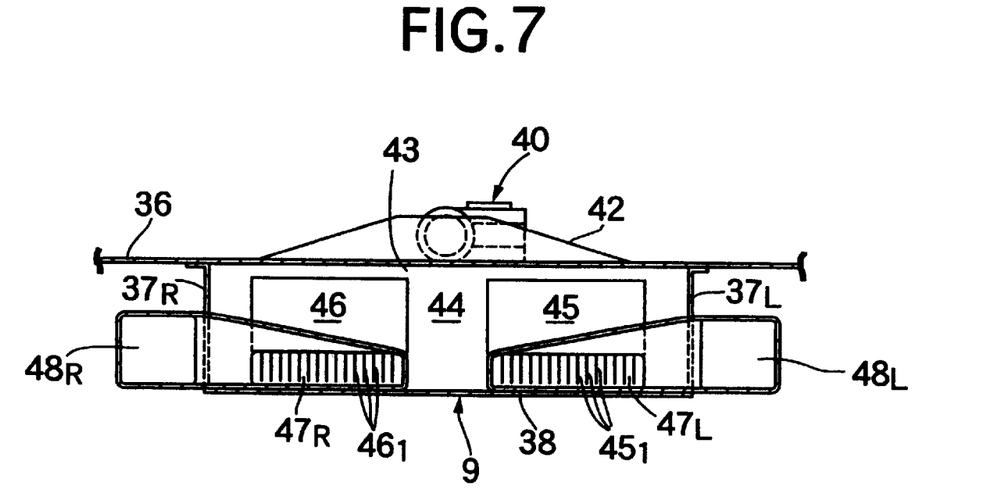
FIG. 7 is a sectional view taken along a line 7—7 in FIG. 5.

The structure of the battery box 9 will be described below with reference to FIGS. 5 to 7.

The twenty four batteries 10 are mounted in two laterally spaced rows in the rear portion of the battery box 9 disposed along a lower surface of a floor panel 36, and a plurality of clearances a for passage of cooling air are defined between longitudinally adjacent one of the batteries 10, respectively. A clearance β is defined between left end faces of the batteries 10 in the right row and right end faces of the batteries 10 in the left row, and clearances γ are defined between right end faces of the batteries 10 in the right row and a right sidewall $37_R$ of the battery box 9 and between left end faces of the batteries in the left row and a left sidewall $37_L$ of the battery box 9, respectively.

Figure 5:
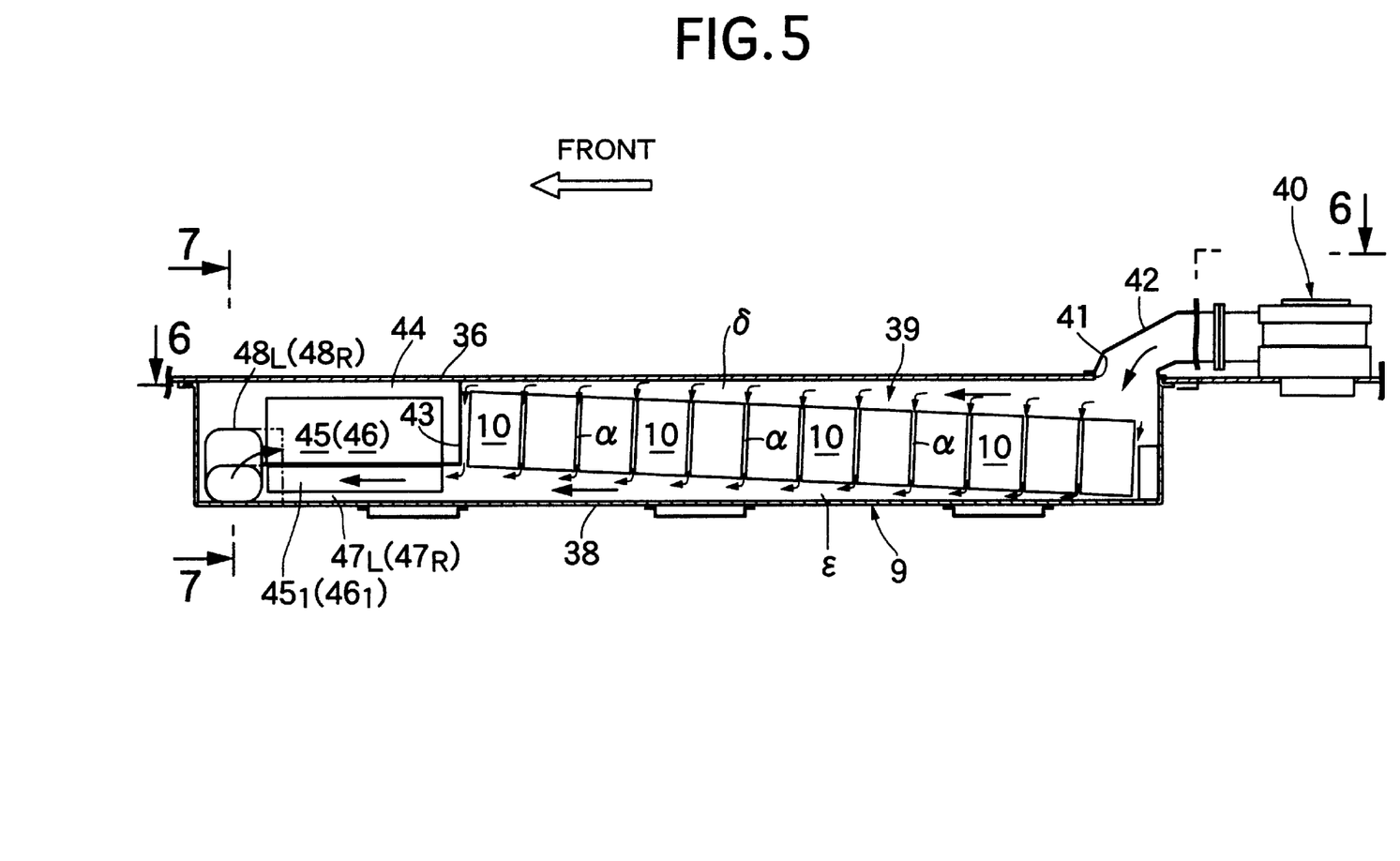
FIG. 5 is a vertical sectional view of a battery box.

As can be seen from FIG. 5, the batteries in each of the rows are disposed in an inclined fashion such that their front ends are higher in level than their rear ends. As a result, a clearance δ decreased in height forwards is defined between upper surfaces of the batteries and a lower surface of the floor panel 36, and a clearance ε increased in height forwards is defined between lower surfaces of the batteries and an upper surface of a bottom wall 38 of the battery box 9. A first cooling air passageway 39 for passage of cooling air is defined in a rear portion of the battery box 9 by the clearances α, β, γ, δ and ε surrounding the peripheries of the batteries 10.

A cooling fan 40 comprising, for example, a siroco fan, is mounted on an upper surface of the floor panel 36 rearwardly of the battery box 9. The cooling fan 40 is connected to a cooling air inlet 41 defined in the floor panel 36 on the upper surface of the rear end of the battery box by a cooling air introducing duct 42 which is gradually wider forwards. Therefore, the outside air drawn by the cooling fan 40 is supplied via the cooling air introducing duct 42 and the cooling air inlet 41 to a rear end of the first cooling air passageway 39 defined in the battery box 9.

An electric part accommodating chamber 44 is defined by a partition wall 43 in front of the batteries 10 accommodated in the battery box 9, and the electric parts 45 and 46 separated in two blocks are accommodated in the electric part accommodating chamber 44. One block of the electric parts 45 is comprised, for example, of the contact box 21, the junction board 22, the managing ECU 23, the motor ECU 24, the downverter 26 and the air-conditioning inverter 27, and the other block electric part 46 is comprised, for example, of the on-board charger 25.

A pair of left and right second cooling air passageways $47_L$ and $47_R$ are defined to extend forward from below the partition wall 43. A pair of left and right cooling air discharge ducts $48_L$ and $48_R$ are connected to the second cooling air passageways $47_L$ and $47_R$ and extend to the outside through the left and right sidewalls $37_L$ and $37_R$ of the battery box 9. The one electric part 45 is supported on an upper wall of the left second cooling air passageway $47_L$, and a large number of cooling fins $45_1$ extending downwards from the electric part 45 protrude into the left second cooling air passageway $47_L$. The other electric part 46 is supported on an upper wall of the right second cooling air passageway $47_R$, and a large number of cooling fins $46_1$ extending downwards from the electric part 46 protrude into the right second cooling air passageway $47_R$.

Therefore, cooling air passed through the first cooling air passageway 39 is passed through the left and right second cooling air passageways $47_L$ and $47_R$ and then discharged through the left and right cooling air discharge ducts $48_L$ and $48_R$ to the outside of the battery box 9. A total sum of the sectional areas of the left and right second cooling air passageways $47_L$ and $47_R$ is set smaller than the sectional area of the first cooling air passageway 39. Therefore, a flow rate (e.g., 5 m/sec) of the cooling air passed through the second cooling air passages $47_L$ and $47_R$ is larger than a flow rate (e.g., 2 m/sec) of the cooling air passed through the first cooling air passageway 39.

The operation of the first preferred embodiment of the present invention having the above-described arrangement will be described below.

When the cooling fan 40 is driven to cool the batteries 10 and the electric parts 45 and 46 heated during operation of the electric vehicle V, the cooling air is supplied from the cooling air introducing duct 42 and the cooling air inlet 41 to the rear end of the first cooling air passageway 39, wherein the cooling air cools the batteries 10, while it flows from rear to front through the first cooling air passageway 39. The cooling air inlet 41 is provided at the upper portion of the rear end of the first cooling passageway, and the second cooling air passageways $47_L$ and $47_R$ are connected to the lower portion of the front end of the first cooling air passageway 39. Therefore, most of the cooling air flowing from rear to front through the first cooling air passageway 39 performs the heat exchange with the batteries while being passed through the plurality of clearances α between the adjacent ones of the batteries 10 to flow from above to below. A portion of the cooling air is not passed through the clearances α, but is passed through the clearance β between the two rows of the batteries and the clearances γ, γ on left and right sides to flow from above to below.

This will be further described in detail. In the course of flowing of the cooling air supplied to the upper portion of the rear end of the first cooling air passageway 39 in a forward direction through the clearance δ above the batteries 10, a portion of such cooling air is passed from above to below sequentially through the clearances α. The cooling air portions joined in the clearance e below the batteries 10 flow forwards toward the second cooling air passageways $47_L$ and $47_R$. At this time, the flow rate of the cooling air flowing forwards through the clearance δ above the batteries 10 is sequentially decreased by diverting of the cooling air to the clearances a. However, the height of the clearance δ is decreased toward the front portion thereof to correspond to the decrease in flow rate of the cooling air and hence, the flowing of the cooling air along the clearance δ is performed smoothly. The flow rate of the cooling air flowing forwards through the clearance ε below the batteries 10 is increased sequentially by joining of the cooling air portions from the clearances α. However, the height of the clearance ε is increased forwards to correspond to the increase in flow rate of the cooling air and hence, the flowing of the cooling air along the clearance ε is performed smoothly.

The cooling air which has cooled the batteries 10 while passing through the first cooling air passageway 39 flows into the second cooling air passageways $47_L$ and $47_R$, and comes into contact with the cooling fins $45_1$ and $46_1$ extending from the electric parts 45 and 46 for heat exchange, while flowing forwards through the second cooling air passageways $47_L$ and $47_R$. The cooling air which has finished the cooling of the electric parts 45 and 46 is discharged to the outside of the battery box 9 via the left and right cooling air discharge ducts $48_L$ and $48_R$.

The sectional area of the first cooling air passageway 39 is larger than the combined sectional areas of the second cooling air passageways $47_L$ and $47_R$ and hence, the flow rate of the cooling air is smaller in the first cooling air passageway 39 and larger in the second cooling air passageways $47_L$ and $47_R$. Therefore, the cooling air of a lower flow speed is applied to the batteries 10 each having a battery case made of a synthetic resin having a larger heat resistance, thereby providing an enhanced cooling effect therefor. In addition, the cooling air of a higher flow rate is applied to the cooling fins $45_1$ and $46_1$ of the electric parts 45 and 46 having a small heat resistance as compared with the batteries 10, thereby providing an enhanced cooling effect therefor. By ensuring that the sectional areas of the first cooling passageway 39 and the second cooling passageways $47_L$ and $47_R$ are different from each other in the above manner, the proper cooling of both of the batteries 10 and the electric parts 45 and 46 having the different heat resistance can be achieved by using the common cooling fan 40.

Since the first cooling air passageway 39 for cooling the batteries 10 is disposed at the upstream location and the second cooling air passageways $47_L$ and $47_R$ for cooling the electric parts 45 and 46 are disposed at the downstream locations relative to the airflow, the batteries 10 having a narrow acceptable range of temperature (e.g., equal to or lower than 45° C.) can be cooled reliably by fresh outside air which is not risen in temperature. The electric parts 45 and 46, on the other hand are cooled by the cooling air which has already cooled the batteries 10 and has correspondingly become slightly increased in temperature. However, this provides no hindrance, because the electric parts 45 and 46 have a wide acceptable range of temperature, as compared with the batteries 10.

If the cooling air were to come into direct contact with the electric parts 45 and 46, there is a possibility that an adverse effect is exerted on the reliability and durability of the electric parts 45, 46 due to dusts and water and other foreign matter contained in the cooling air. However, the reliability and durability of the electric parts 45 and 46 can be ensured by such a construction that the electric parts 45 and 46 excluding the fins 45, 46, are accommodated in the electric part accommodating chamber 14, so that they do not come into direct contact with the cooling air.

Figure 8:
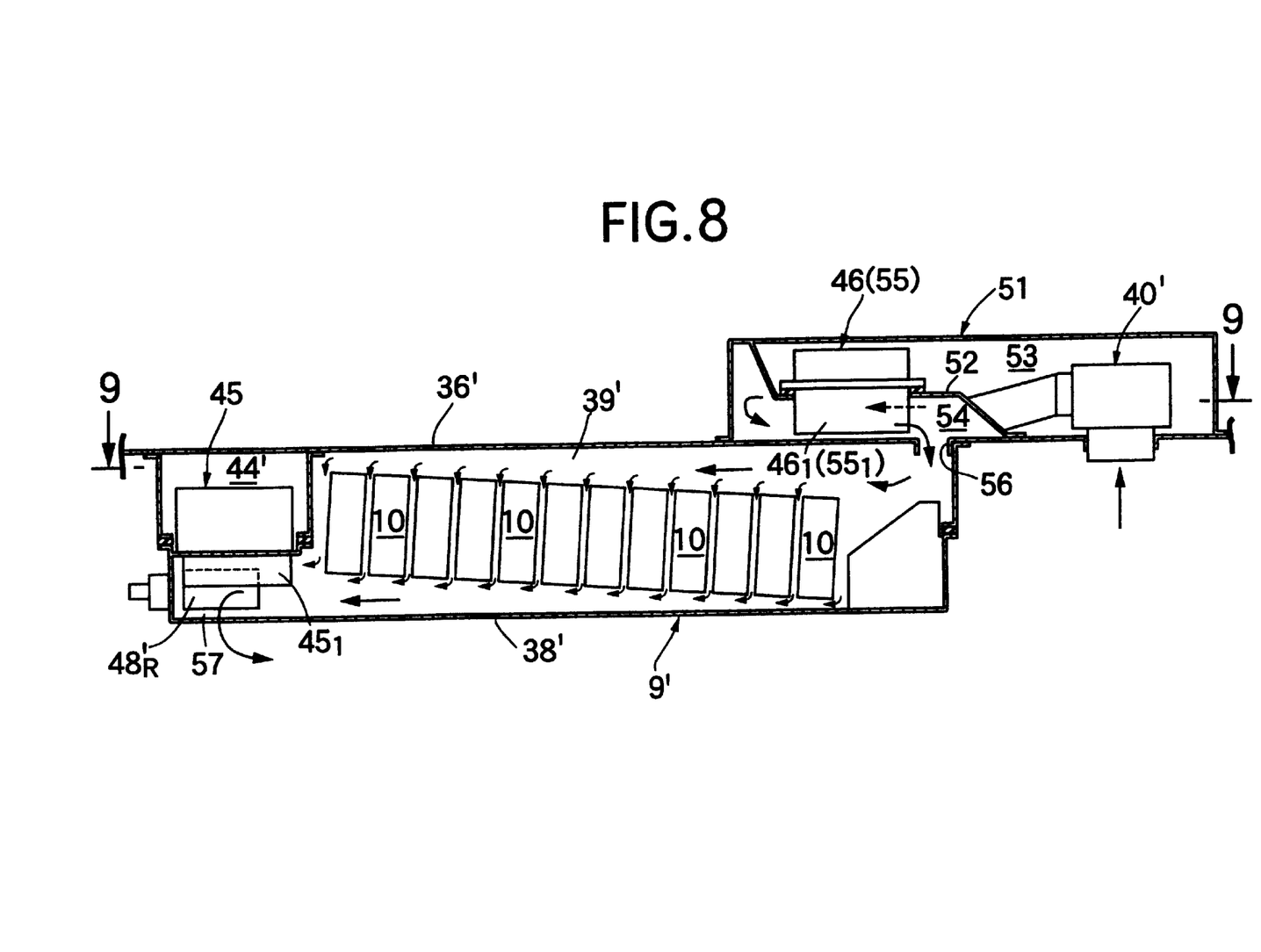
FIG. 8 is a view similar to FIG. 5.

A second embodiment of the present invention will now be described with reference to FIGS. 8 and 9.

The second embodiment includes an auxiliary cooling chamber 51 on a portion of an upper surface of the floor panel 36, above a rear portion of a battery box 9. The auxiliary cooling chamber 51 is divided into an upper electric part accommodating chamber 53 and a lower, third cooling air passage 54. Electric parts 46 and 55 and a cooling fan 40' are accommodated in the electric part accommodating chamber 53. The electric part 46 is an on-board charger 25, and the electric part 55 is a downverter 26.

Figure 9:
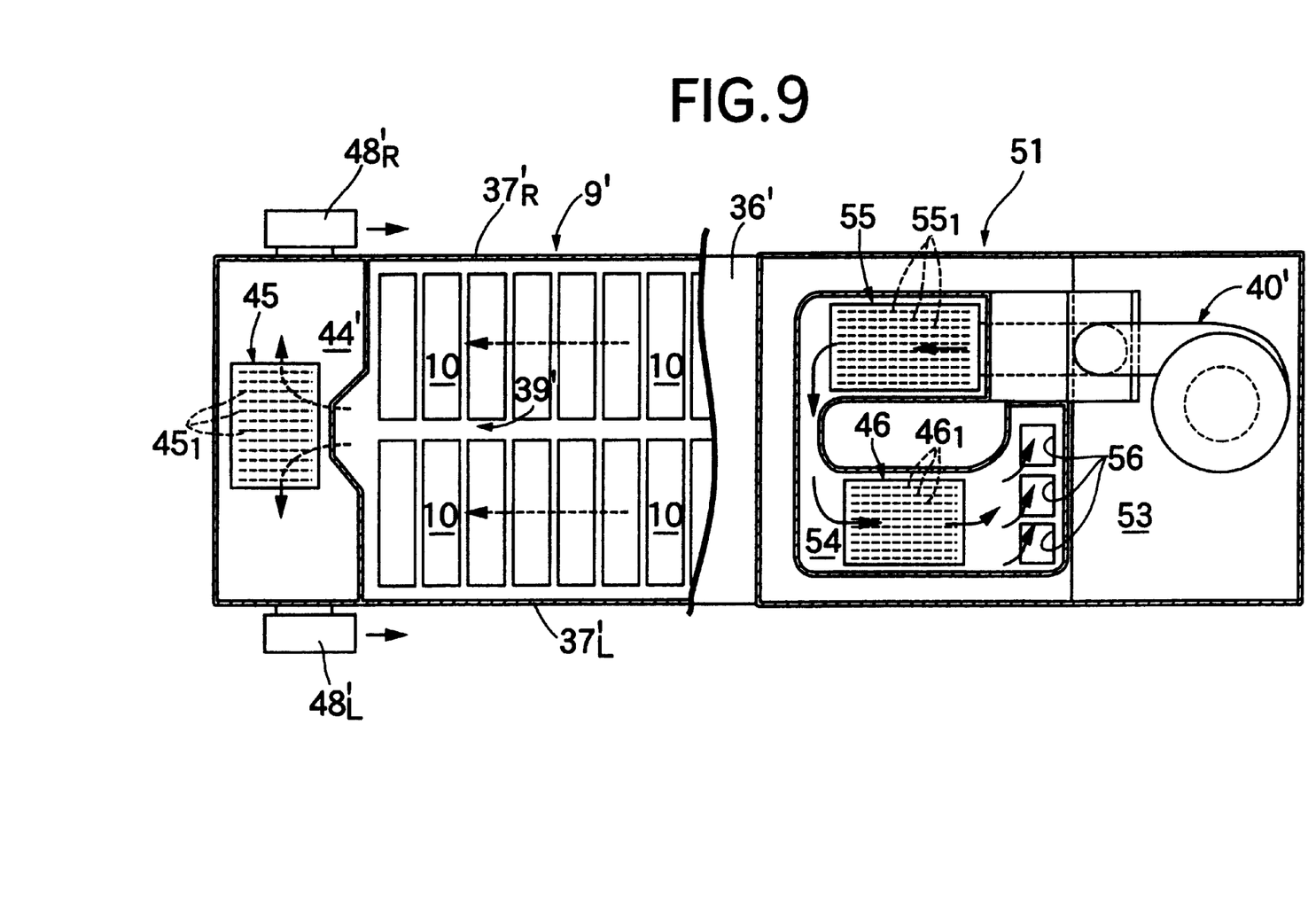
FIG. 9 is a sectional view taken along a line 9—9 in FIG. 8.

The third cooling air passage 54 is curved into a substantially C-shape as viewed in a plane (FIG. 9). The cooling fan 40' is connected to an upstream end of the third cooling air passage 54, and a downstream end of the third cooling air passage 54 communicates with an upstream end of the first cooling air passage 39' within the battery box 9' through three openings 56. Cooling fins $46_1$ and $55_1$ extending downwards from the electric parts 46 and 55 accommodated in the electric part accommodating chamber 53 protrude into the third cooling air passage 54.

As in the first embodiment, twenty four batteries 10 are accommodated in the first cooling air passage 39' defined in rear half of the battery box 9'. An electric part accommodating chamber 44' and a second cooling air passage 57 are vertically separated in front half of the battery box 9', and cooling fins $45_1$ extending downwards from the same electric part 45 as in the first embodiment which is accommodated in the electric part accommodating chamber 44', protrude into the second cooling air passage 57.

Thus, the cooling air supplied to the third cooling air passage 54 in the auxiliary cooling chamber 51 by the cooling fan 40' s heat-exchanged with the cooling fins $46_1$ and $55_1$ protruding into the third cooling air passage 54 to cool the electric parts 46 and 55, and then flows through the openings 56 into the first cooling air passage 39' in the battery box 9'. The cooling air which has cooled the batteries 10 while flowing forwards in the first cooling air passage 39' is heat-exchanged with the cooling fins $45_1$ to cool the electric part 45, while passing through the second cooling air passage 57, and is then discharged to the outside through the cooling air discharge ducts $48'_L$ and $48'_R$.

Even with the second embodiment, the part reliability and durability can be ensured while effectively cooling the electric parts 45 and 46, by such a construction that the cooling fins $45_1$, $46_1$ and $55_1$ extending from the electric parts 45, 46 and 55 are brought into contact with the cooling air, and the electric parts 45, 46 and 55 are accommodated in the electric part accommodating chambers 44' and 53, so that they do not come into direct contact with the cooling air.

Although the preferred embodiments of the present invention have been described in detail, it will be understood that the present invention is not limited to the above-described embodiments, and that various modifications in design may be made without departing from the spirit and scope of the invention defined in claims.

For example, in the first embodiment, the electric parts 45 and 46 are divided into the two blocks and in the second embodiment, the electric parts 45, 46 and 55 are divided into the three blocks. However, the electric parts may be divided in any manner. In the embodiments, the cooling air is applied to the cooling fins $45_1$, $46_1$ and $55_1$ provided on the electric parts 45, 46 and 55, it is within the scope of the present invention, that all the electric parts 45, 46 and 55 may be disposed in the passages $47_L$, $47_R$, 57, 54.

What is claimed is:

1. A cooling structure in an electric vehicle comprising batteries for supplying electric current to a motor, and an electric part connected to at least one of said motor and said batteries, wherein said batteries and said electric part are accommodated in a battery box and are cooled by supplying air from a cooling fan to cooling air passages defined in said battery box, wherein a sectional area of a second one of said cooling air passages for cooling said electric part is smaller than that of a first one of said cooling air passages for cooling said batteries; and said first cooling air passage and said second cooling air passage are disposed at locations upstream and downstream in a direction of flow of the cooling air, respectively.

2. A cooling structure according to claim 1, wherein said second cooling air passage is disposed adjacent an electric part accommodating chamber in which said electric part is accommodated, and cooling fins extending from said electric part accommodated in said electric part accommodating chamber are disposed to protrude into said second cooling air passage.

3. A cooling structure according to claim 1, wherein said cooling fan draws ambient air around the vehicle as the cooling air.

4. A cooling structure according to claim 1, wherein the cooling air from said cooling fan enters one end of said battery box, and said battery box includes a discharge duct for said cooling air at an opposite end thereof.

5. A cooling structure according to claim 1, wherein said battery box includes means for shielding said electric part from direct contact with said cooling air.

6. A cooling structure according to claim 5, wherein said shielding means includes an electric part accommodating chamber in which said electric part is accommodated disposed adjacent said second one of said cooling air passages, and cooling fins extending from said electric part through said accommodating chamber and protruding into said second one of the cooling air passages.

7. A cooling structure according to claim 1, wherein said batteries are arranged in said first one of said cooling air passages such that the cooling air contacts all external surfaces of each said battery, and such that the cooling air flows smoothly from one end of the first cooling air passage to the other end thereof.

8. A cooling structure according to claim 7, wherein one space within said battery box above said batteries progressively varies in height from a rear end to a front end of said first cooling air passage, and another space within said battery box below said batteries progressively varies in height from the rear end to the front end of said first cooling air passage in a manner opposite to said one space.

9. A cooling structure in an electric vehicle comprising batteries for supplying electric current to a motor, and an electric part connected to at least one of said motor and said batteries, wherein said batteries and said electric part are accommodated in a battery box and are cooled by supplying air from a cooling fan to cooling air passages defined in said battery box, wherein a sectional area of a second one of said cooling air passages for cooling said electric part is smaller than that of a first one of said cooling air passages for cooling said batteries; and one of an inlet and an outlet to said first cooling air passage is provided near an upper surface of said battery box, and the other of said inlet and said outlet to said first cooling air passage is provided near a lower surface of said battery box.

10. A cooling structure in an electric vehicle in which an electric part connected to at least one of a traveling motor and batteries for supplying current to said motor is cooled by cooling air from a cooling fan, said cooling structure comprising:

a cooling air passage for flowing of the cooling air from said cooling fan, said cooling air passage being disposed adjacent an electric part accommodating chamber in which said electric part is accommodated;

cooling fins extending from said electric part accommodated in said electric part accommodating chamber being disposed to protrude into said cooling air passage; and a battery box housing said batteries and said electric part accommodating chamber, and having said cooling air passage defined therein, said passage having a first portion in which said batteries are disposed and a second portion in which said cooling fins are disposed, said first and second portions extending continuously from each other such that the cooling air from the cooling fan cools the batteries, as well as the cooling fins.

11. A cooling structure according to claim 10, wherein the first portion of the cooling air passage has a larger sectional area than that of the second portion such that a flow rate of the cooling air in the first portion is smaller than a flow rate of the cooling air in the second portion.

12. A cooling structure according to claim 10, wherein the cooling air from said cooling fan enters one end of said battery box, and said battery box includes a discharge duct for said cooling air at an opposite end thereof.

13. A cooling structure according to claim 10, wherein said second portion of the cooling air passage is disposed downstream of the first portion in a direction of flow of the cooling air.

14. A cooling structure according to claim 10, wherein said batteries are arranged in said first portion of said cooling air passage such that the cooling air contacts all external surfaces of each said battery, and such that the cooling air flows smoothly from one end of the first portion of the cooling air passage to the other end thereof.

15. A cooling structure according to claim 14, wherein one space within said battery box above said batteries progressively varies in height from a rear end to a front end of said first portion of said cooling air passage, and another space within said battery box below said batteries progressively varies in height from the rear end to the front end of said first portion of the cooling air passage in a manner opposite to said one space.

16. A cooling structure according to claim 10, wherein one of an inlet and an outlet to said first portion of said cooling air passage is provided near an upper surface of said battery box, and the other of said inlet and said outlet to said first portion of the cooling air passage is provided near a lower surface of said battery box.

17. A cooling structure in an electric vehicle comprising:
a motor;
a plurality of batteries for providing electric current to said motor;
an electric part connected to at least one of said batteries and said motor;
a battery box housing said batteries and said electric part; and
cooling means associated with said battery box and including a single cooling fan for supplying cooling air to said batteries and said electric part;
said battery box having a cooling air passage defined therein, said passage having a first portion in which said batteries are disposed and a second portion in which cooling fins extending from said electric part are disposed, said first and second portions extending continuously from each other, and said first portion of the cooling air passage having a larger sectional area than that of the second portion such that a flow rate of the cooling air in the first portion is smaller than a flow rate of the cooling air in the second portion.

18. A cooling structure according to claim 17, wherein said battery box includes means for shielding said electric part from direct contact with said cooling air.

* * * * *

UNITED STATES PATENT AND TRADEMARK OFFICE
CERTIFICATE OF CORRECTION

PATENT NO. : 6,094,927
DATED : August 1, 2000
INVENTOR(S) : Makoto Anazawa, Kazuhiko Aitaka and Kazunori Watanabe It is certified that error appears in the above-identified patent and that said Letters Patent is hereby corrected as shown below:

Title page,
Title, change "AN" to -- IN --;
Item "[57], ABSTRACT", line 14, after "continuously" insert -- from --.

Column 1,
Line 1, change "AN" to -- IN --;
Line numbered approximately 8, after "electric part" insert -- using --;
Line 12, change "parts" to -- part(s) --;
Line 17, change "If" to -- When --; change "part" to -- part(s) --;
Line 23, after "regard" insert a comma; after "batteries" insert a comma;
Line 25, after "resistance" insert a comma; change "maybe" to -- may be --; after "enhanced" delete the comma;
Line 26, change "that the" to -- that --;
Line 28, change "parts" to -- part(s) --;
Line 29, after "metal" insert a comma;
Line 33, change "parts" to -- part(s) --;
Line numbered between 38 and 39, change "contained-in" to -- contained in --;
Line numbered between 45 and 46, change "parts" to -- part(s) --;
Line 53, change "electric, parts" to -- electric part(s) --;
Line 54, change "first and" to -- first aspect and --;
Line 56, before "vehicle" insert -- the present --.

Column 2,
Line 17, change "having" to -- , which have --;
Line 41, after "in" insert -- the --; change "passage, the" to -- passage, --;
Line 44, before "is" insert -- , excluding the cooling fins, --;
Lines 60-62, change "battery box and cooling means for an electric vehicle according to a" to -- , with the vehicle body being shown in broken lines to reveal inner structural details --;
Line 63, before the semicolon insert -- , again, with the vehicle body shown in broken lines --;
Line 65, before "with" insert -- similar to Fig. 2 --.

UNITED STATES PATENT AND TRADEMARK OFFICE
CERTIFICATE OF CORRECTION

PATENT NO. : 6,094,927
DATED : August 1, 2000
INVENTOR(S) : Makoto Anazawa, Kazuhiko Aitaka and Kazunori Watanabe It is certified that error appears in the above-identified patent and that said Letters Patent is hereby corrected as shown below:

Column 3,
Line 1, before the semicolon insert -- and cooling means therefor --;
Line 2, before "sectional" insert -- plan --;
Line 4, before "sectional" insert -- vertical --;
Line 6, before "second" insert -- battery box and cooling means for an electric vehicle according to a --;
Line 61, after "21" insert a comma;
Line 62, after "10" insert a comma.

Column 4,
Line 28, change "clearances a" to -- clearances $\alpha$ --;
Line numbered between 42 and 43, change "$\epsilon$" to -- $\varepsilon$ --;
Line numbered between 47 and 48, change "$\epsilon$" to -- $\varepsilon$ --.

Column 5,
Line 60, change "clearance e" to -- clearance $\varepsilon$ --;
Line 65, change "clearances a" to -- clearances $\alpha$ --.

Column 6,
Line 3, change "$\epsilon$" to -- $\varepsilon$ --;
Line 5, change "$\epsilon$" to -- $\varepsilon$ --;
Line 8, change "$\epsilon$" to -- $\varepsilon$ --;
Line numbered between 36 and 37, change "resistance" to -- resistances --;
Line numbered between 46 and 47, after "hand" insert a comma;
Line numbered between 55 and 56, change "45, 46" to -- 45 and 46 --; change "dusts and" to -- dusts, --;
Line numbered approximately 59, after "45 and 46" insert a comma;
Line numbered approximately 60, change "45, 46" to -- 45$_1$, 46$_2$ --.

UNITED STATES PATENT AND TRADEMARK OFFICE
CERTIFICATE OF CORRECTION

PATENT NO. : 6,094,927
DATED : August 1, 2000
INVENTOR(S) : Makoto Anazawa, Kazuhiko Aitaka and Kazunori Watanabe It is certified that error appears in the above-identified patent and that said Letters Patent is hereby corrected as shown below:

Column 7,
Line 28, change "40' s" to -- 40' is --;
Line 59, after "55", insert -- but --;
Line 67, after "supplying" insert -- cooling --.

Signed and Sealed this

Sixteenth Day of April, 2002

*Attest:*

JAMES E. ROGAN
*Attesting Officer*     *Director of the United States Patent and Trademark Office*